UNITED STATES PATENT OFFICE.

DAVID F. BROWN, OF OMAHA, NEBRASKA.

ORNAMENTATION OF GLASS IN IMITATION OF FROSTING.

SPECIFICATION forming part of Letters Patent No. 299,516, dated June 3, 1884.

Application filed November 15, 1883. (Specimens.)

*To all whom it may concern:*

Be it known that I, DAVID F. BROWN, a citizen of the United States, residing at Omaha, in the county of Douglas and State of Nebraska, have invented certain new and useful Improvements in the Ornamentation of Glass in Imitation of Frosting; and I hereby declare the following to be a full, clear, and exact description of the same, which will enable others skilled in the art to apply the invention.

The method now commonly practiced in producing frosted ornamental glass are of two characters: first, that by applying stop-outs to the glass in accordance with the desired figure, and then etching the unprotected surface by the use of hydrofluoric acid, and, secondly, by protecting the glass by a figure corresponding to the desired pattern, and then subjecting the unprotected surface to the cutting action of a sand-blast, both of which processes are more or less expensive, and involve considerable labor, time, and expense. My invention looks to a more simple, inexpensive, and efficient method of producing equally pleasing effects; and it consists in the application to the surface of the glass of coats of varnish or like adhesive material and a certain fine, scaly, silicious matter, of a character which will hereinafter more fully appear.

There is found in the Republican River valley and the river Loup, in the State of Nebraska, and in various other localities near the remains of old geyser-tubes, a silicious alkaline earth, supposed to be due to geyser action, and to belong to the pliocene period. This material, on analysis, is found to be composed of silica, 67.01; water, 8.03; soda and potassa, 7.87; magnesia, 4.05; alumina, 7.11; iron, 2.81; lime, 2.01; total, 98.89, varying somewhat in the different localities. This silicious alkaline earth, containing some seventy per cent. of silica, I prepare for use by a process of sifting and bolting into three or more grades, and the finest grade is then leached to remove the alkalies and other impurities, if any be present. The silica thus obtained is in the condition of an almost impalpable powder, which is insoluble except in hydrofluoric acid, and infusible except under the oxyhydrogen-flame. Under the microscope it is found to differ from other forms of silica, being composed of translucent crystals of scale form and of incalculable thinness. It is this form of silicious matter I employ in carrying out my invention, which may be done as follows: I apply to the surface of the glass to be ornamented or frosted a fine coat of adhesive drying material,- preferably the best copal varnish, and upon the same I arrange the pattern of the figure to be produced, and then dust, sieve, or otherwise apply upon the unprotected varnished surface the fine silicious material hereinbefore specified. When the coat thus formed is sufficiently dry and hard, I grind down the surface to the desired thinness or transparency, and apply thereto a second coat of varnish. I then apply a pattern which shall protect the varnished surface outside the figure of the former pattern, after which I give the exposed surface a second covering of the fine silicious matter. The article is then finished, or, if preferred, the surface may be again ground down.

In some instances the surface of the glass may be varnished, and the silicious material applied so as to produce a solid or continuous frosted surface, and any desired ornamentation may be subsequently produced thereon by a graver, and by means of a suitable lathe mechanism highly ornamental effects may be thus produced.

By the use of proper pigments with the size or varnish employed, all the effects of stained as well as frosted glass may be obtained without departing from the scope of my invention.

The ordinary silicas or sands will not effect the result I have in view, as in form, fineness, and translucency they are unsuitable for obtaining fine effects.

The material I have specified, by its scale form, impalpable condition, and translucency, is specially adapted to the carrying out of my invention.

I have spoken specifically of the use of the finest grades, as it is best adapted for work which is to bear close inspection; but for distant lights—such as domes, skylights, &c.— the coarser grades may be employed, as they also possess the scaly form and translucent character which give the peculiar advantage to the material. The glass will be found much stronger, as the surface is not destroyed, as in etching or by the sand-blast.

Having thus described my invention, what I claim, and desire to secure by Letters Patent, is—

1. The method herein described for the production of ornamental imitation frosted glass, which consists in first coating the surface to be ornamented with a varnish or like adhesive material, and then applying thereto a coating of the translucent, scaly, silicious matter herein specified.

2. Glass or like vitreous ware having a frosted surface of adhesive material, and the scaly, translucent, silicious material herein specified.

In testimony whereof I affix my signature, in presence of two witnesses, this 12th day of November, 1883.

DAVID F. BROWN.

Witnesses:
JOHN F. BEHM,
JAMES CREIGHTON.